UNITED STATES PATENT OFFICE.

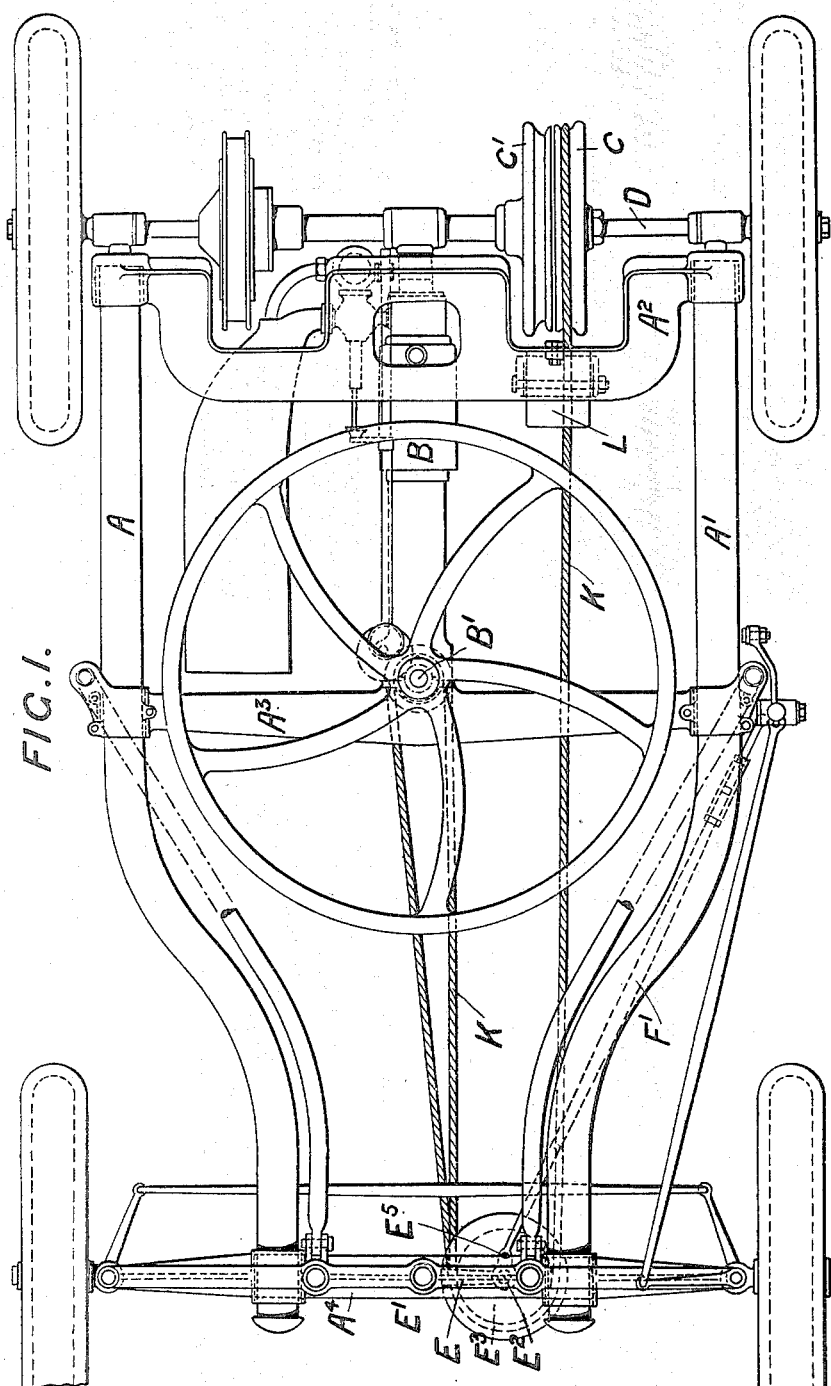

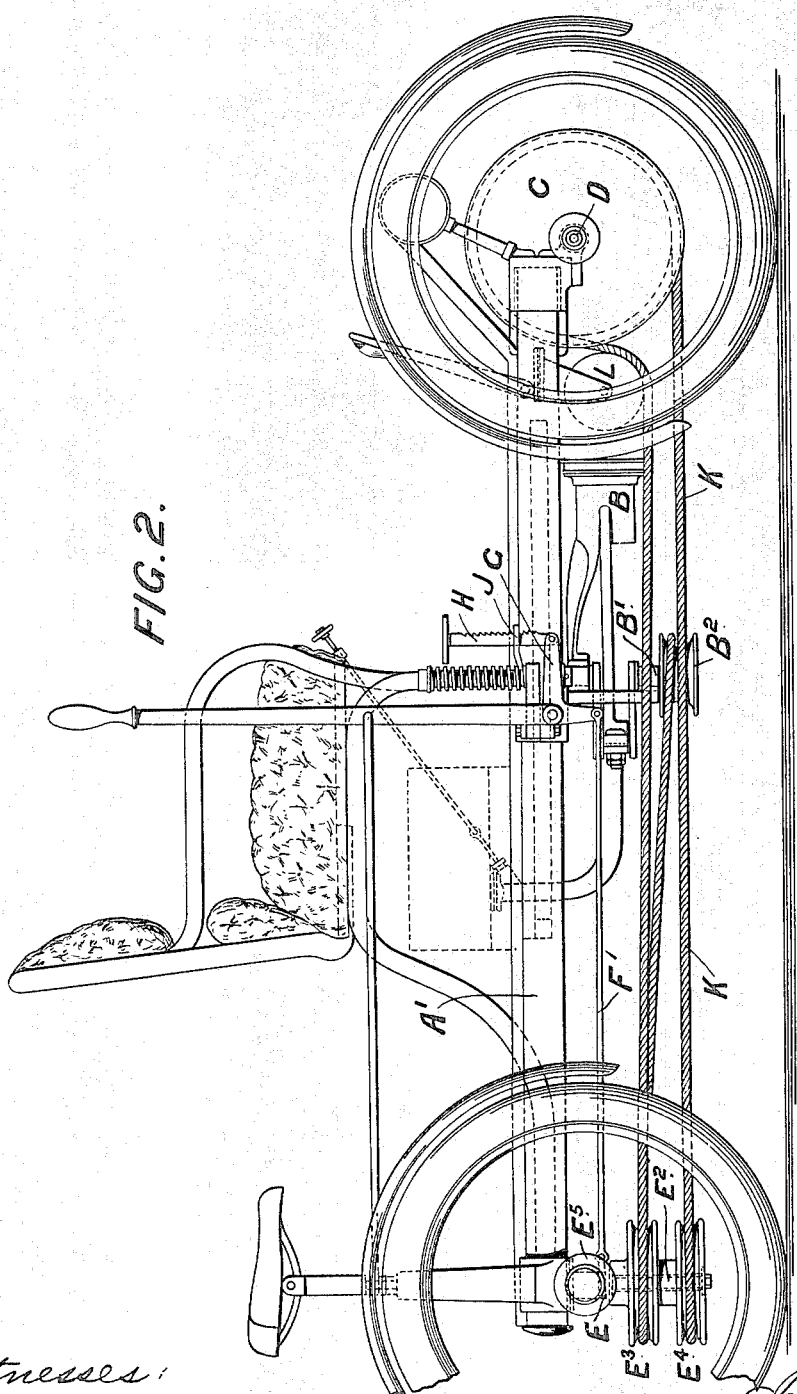

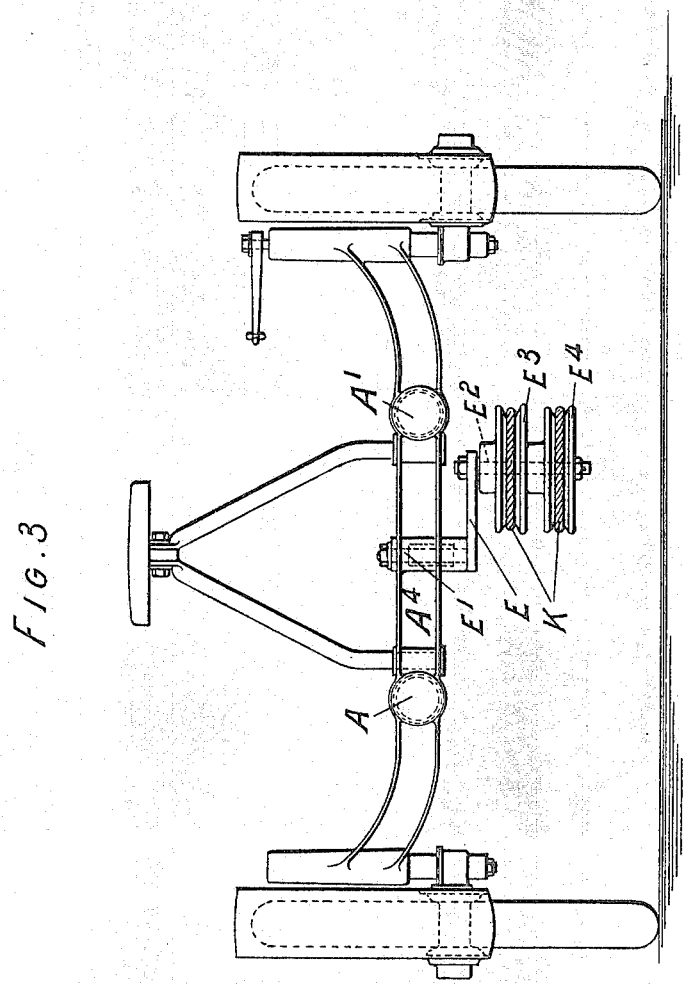

WILLIAM BAINES, OF LONDON, ENGLAND.

TRANSMISSION-GEAR FOR SELF-PROPELLED VEHICLES.

SPECIFICATION forming part of Letters Patent No. 640,522, dated January 2, 1900.

Application filed September 18, 1899. Serial No. 730,889. (No model.)

*To all whom it may concern:*

Be it known that I, WILLIAM BAINES, a subject of the Queen of England, residing at London, England, have invented certain new and useful Improvements in or Relating to Transmission-Gear for Self-Propelled Vehicles, (for which I have made application for Letters Patent in Great Britain under No. 18,962, dated September 5, 1898,) of which the following is a specification.

This invention relates to the transmission of the power of self-propelled vehicles. This is easily effected by belts or toothed gearing; but in carrying out my invention I employ a rope or cable running in or upon suitable pulleys or drums preferably grooved for the purpose. This is particularly useful where I have the fly-wheel rotating in a horizontal plane, as the rope accommodates itself readily to the change of direction of motion from the fly-wheel or engine-shaft to that of the road-wheels of the vehicle, the pulleys employed for effecting this change of motion being applicable also as jockey-pulleys to secure or prevent the necessary tightness of the rope, according as it is desired to drive or to slip. If the fly-wheel be not placed upon the engine-shaft, but merely connected therewith, the rope may be used as the means of transmission of power from the engine-shaft to the fly-wheel or to its shaft or boss and either directly or indirectly from there to the counter-shaft or road-wheels. The ropes may be boxed in, if desired; but as they are not so easily affected by exposure to the weather or dirt this is not of such importance as in the case of belts or toothed gears.

In the accompanying drawings, Figure 1 is a plan, Fig. 2 a side view, and Fig. 3 an end view, showing a convenient method of applying this invention to a four-wheeled autocar.

Like letters indicate like parts throughout the drawings.

The main frame of the car comprises side pieces A A' and cross-bars $A^2$ $A^3$ $A^4$.

The engine B has in this case a vertical main shaft B', supported on the cross-bar $A^3$ of the frame and carrying the driving-pulley $B^2$ on its lower end. The driven pulleys C C' for fast and slow speeds, respectively, are placed on the axle D of the road driving-wheels. On the rear cross-bar $A^4$ of the frame is a horizontal arm E, one end of which is pivoted on the cross-bar by a pin E', while its free end is furnished with a vertical pin $E^2$, on which are carried two pulleys $E^3$ $E^4$, free to rotate on said pin. The free end of the arm is also provided with a lug $E^5$, to which is pivotally attached one end of a connecting-rod F'. The other end of the rod F' is connected to one arm of a bell-crank lever G, pivoted onto the side frame A', the other arm of which is pivoted to a toothed bar H. This toothed bar H is placed below and in front of the vehicle-seat, as shown in Fig. 2, so as to be conveniently manipulated by the occupant of the car, and is carried in a slotted lug or projection J, provided with teeth to engage the teeth of the bar. As shown in the figure, the bar H is adapted to be worked by the foot. It is evident it may be arranged for operation by the hand and may be given a screw action instead of ratchet-teeth, as shown.

The driving-rope or power-transmitter K passes from the driving-pulley $B^2$ back to the idler-pulley $E^3$, and in the arrangement shown in the drawings it is then carried forward beneath a stationary idler L over the driven pulley C or C', from below which it passes back to the idler-pulley $E^4$ and thence back to the driving-pulley $B^2$. By this arrangement a very long rope or equivalent is obtained.

By operating the bar H the power-transmitter can be tightened or slackened, as desired. By pressing down the lever the arm E by the action of the bell-crank lever G and connecting-rod F' is swung back, carrying with it the idlers $E^3$ $E^4$ and tightening the transmitter, and since four runs of the rope are affected the amount of slack taken up will be four times the length through which the arm has been swung. By engaging the teeth on the bar with the corresponding teeth in the slot the arm and its pulleys are held in the desired position, while by releasing the bar H the transmitter is at once slackened.

Although I prefer to use a rope or cable of circular cross-section, I do not bind myself to any special section, and it is evident that flat ropes or belts could be used with this method of driving.

What I claim as my invention, and desire to secure by Letters Patent, is—

1. In transmission-gear for self-propelled vehicles, the combination with a driven pulley at one end of the vehicle, two idler-pulleys at the opposite end adapted to be simultaneously moved toward or from the driven pulley and a rope passing around the several pulleys.

2. In transmission-gear for self-propelled vehicles, the combination with an engine placed approximately in the longitudinal center of the vehicle, a driven shaft or part at one end of the vehicle, and two idler-pulleys running in opposite directions and one or both of them adjustable at the other end of the vehicle, of a rope or equivalent power-transmitter connecting these parts and having its separate "runs" passing around the respective idler-pulleys substantially as and for the purpose described.

3. In transmission-gear for self-propelled vehicles, the combination with a driven pulley, two idler-pulleys adapted to be simultaneously moved toward or from the driven pulley, a driving-pulley arranged intermediate the driven pulley and the idler-pulleys, and a rope passing around the various pulleys in the manner set forth.

4. In transmission-gear for self-propelled vehicles, the combination with a driven pulley, two idler-pulleys, an arm pivoted at one end, two idler-pulleys carried by the opposite end of the arm, a rod connected at one end to the said arm, and an operating-lever connected with the opposite end of the rod, a driving-pulley, and a rope passing around the several pulleys as set forth.

In testimony whereof I have signed my name to this specification in the presence of two subscribing witnesses.

WILLIAM BAINES.

Witnesses:
ALFRED J. BOULTER,
HARRY B. BRIDGES.